(12) United States Patent
Korkmaz et al.

(10) Patent No.: US 11,487,974 B2
(45) Date of Patent: Nov. 1, 2022

(54) METHOD FOR SOLVING THE PROBLEM OF CLUSTERING USING CELLULAR AUTOMATA BASED ON HEAT TRANSFER PROCESS

(71) Applicant: YEDITEPE UNIVERSITESI, Istanbul (TR)

(72) Inventors: Emin Erkan Korkmaz, Istanbul (TR); Enes Burak Dundar, Istanbul (TR)

(73) Assignee: YEDITEPE UNIVERSITESI, Istanbul (TR)

(*) Notice: Subject to any disclaimer, the term of this patent is extended or adjusted under 35 U.S.C. 154(b) by 710 days.

(21) Appl. No.: 16/473,633

(22) PCT Filed: Apr. 25, 2017

(86) PCT No.: PCT/TR2017/050160
§ 371 (c)(1),
(2) Date: Jun. 26, 2019

(87) PCT Pub. No.: WO2018/125008
PCT Pub. Date: Jul. 5, 2018

(65) Prior Publication Data
US 2021/0132951 A1    May 6, 2021

(30) Foreign Application Priority Data
Dec. 27, 2016  (TR) ................. 2016/19702

(51) Int. Cl.
G06K 9/62    (2022.01)
(52) U.S. Cl.
CPC ......... G06K 9/6276 (2013.01); G06K 9/6222 (2013.01)

(58) Field of Classification Search
None
See application file for complete search history.

(56) References Cited

U.S. PATENT DOCUMENTS

| | | | | |
|---|---|---|---|---|
| 10,664,967 B2* | 5/2020 | Barnes | ...................... | G06T 7/11 |
| 2003/0115021 A1* | 6/2003 | Mates | ................. | G06F 15/7842 702/186 |
| 2021/0132951 A1* | 5/2021 | Korkmaz | ............. | G06K 9/6276 |

OTHER PUBLICATIONS

Marcelo Blatt, Shai Wiseman, and Eytan Domany, "Superparamagnetic Clustering of Data" Phys. Rev. Lett. vol. 76, Nbr. 18, 3251-3254, Published Apr. 29, 1996 (Year: 1996).*

(Continued)

*Primary Examiner* — Tahmina N Ansari
(74) *Attorney, Agent, or Firm* — Bayramoglu Law Offices LLC

(57) ABSTRACT

A computer-implemented method, which enables the data to be clustered without being required to perform any distance calculations among the points of the dataset, includes assigning points of a dataset to cells of a cellular automaton; assigning each cell, having a data point assigned, a distinct state value and a constant temperature value; and assigning all cells, to which a data point is not assigned, a unique state value different from the state values utilized for cells having a data point and to a temperature lower than the constant temperature value; selecting a cell in the cellular automaton randomly; calculating the average temperature of the selected cell and its neighbor cells; setting the temperature of the cells having no data point, as the average temperature; if a neighbor cell temperature is above the predetermined threshold value, moving this neighbor cell to the state of the selected cell.

2 Claims, 7 Drawing Sheets

(56) References Cited

OTHER PUBLICATIONS

Ling Chen et al. A Novel Ant Clustering Algorithm Based on Cellular Automata, Proceedings of the IEEE/WIC/ACM International Conference on Intelligent Agent Technology, Sep. 24, 2004.
Dianxun Shuai, et al. A Novel Stochastic Generalized Cellular Automata for Self-Organizing Data Clustering, Proceedings of the First International Multi-Symposiums on Computerand Computational Sciences, Jun. 24, 2006.
V. Breton et al. A Clustering Algorithm for the LHCb Electromgnetic Calorimeter using a Cellular Automaton, Sep. 26, 2001, retrieved from the Internet: URL:http://cds.cern.ch/record/681262/files/1hcb-2001-123.pdf.
Zhang Botao et al. Cellular Automaton for Super-Paramagnetic Clustering of Data, Proceedings of the 2012 International Conference on Applied Biotechnology (ICAB 2012), Oct. 18-19, 2012 in Tianjin, China. Lecture Notes in Electrical Engineering; ISSN 1876-1100; vol. 249, Jan. 1, 2011 Springer Germany , ISBN:978-3-642-05166-1, vol. 100, pp. 23-29.
Marcin Burzynski et al. Cellular Automata:Sturctures and Some Applications. Journal of Theoretical and Applied Mechanics, Jan. 1, 2004, pp. 461-482, retrieved from the Internet: URL: http://yadda.icm.edu.pl/yadda/element/owmetal.element.baztech-article-bwm2-0023-0035/c/httpwww_ptmts_org_p12004-3-burzynski-in.pdf.
MacKay, David . Chapter 20. An Example Inference Task: Clustering Information Theory, Inference and Learning Algorithms. Cambridge University Press 2003, pp. 284 292. ISBN 0-521-64298-1. MR 2012999.
Margolus N et al. Cellular-Automata Supercomputers for Fluid-Dynamics Modeling. Physical Review Letters, 1986, 56(16):1694-1696.
R. Sibson, Slink: An Optimally Efficient Algorithm for the Single-Link Cluster Method, The Computer Journal. British Computer Society. 1973 ,vol. 16 No. 1, pp. 30-34. doi:10.1093/comjnl/16.1.30.
Boerlijst M. Hogeweg P (1991) Self-Structuring and Selection: Spiral Waves as a Substrate for Prebiotic Evolution. Artificial life 2, 1991 pp. 255-276.
Ermentrout G.B. et al. Cellular Automata Approaches to Biological Modeling. Journal of Theoretical Biology, 1993, 160(1):97-133.
Langton CG, Self-Reproduction in Cellular Automata. Physica 10D: Nonlinear Phenomena 1984, 10(1):135-144.
De Lope J. et al. Data Clustering Using a Linear Cellular Automata Based Algorithm. Neurocomputing 2013, 114:86-91.

* cited by examiner

METHOD FOR SOLVING THE PROBLEM OF CLUSTERING USING CELLULAR AUTOMATA BASED ON HEAT TRANSFER PROCESS

CROSS REFERENCE TO THE RELATED APPLICATIONS

This application is the national phase entry of International Application No. PCT/TR2017/050160, filed on Apr. 25, 2017, which is based upon and claims priority to Turkish Patent Application No. 2016/19702, filed on Dec. 27, 2016, the entire contents of which are incorporated herein by reference.

TECHNICAL FIELD

This invention is related to the methods utilized for processing data with rules. More specifically, the invention is related to a method that utilizes Cellular Automata (CA) in order to cluster data sets.

BACKGROUND

Cellular Automata (CA) is a discrete system consisting of cells that have neighborhood relationship with each other. Computations in CA are done by considering interactions between neighbor cells. Each cell can be in a certain state, and the new state of the cell in the next step is determined based on the states of the neighbor cells. Therefore, a CA evolves based on these local interactions and the model provides means for strong parallel computation. There are CA applications which are utilized to simulate different processes in different disciplines.

CA based clustering techniques have been proposed in the literature. Data clustering is a well-studied problem where the aim is to partition a group of data points into a number of clusters. The partitioning process is expected to form clusters where the variation of the elements in the same cluster would be minimal, whereas the variation of the elements in distinct clusters would be maximal. There are different application areas where clustering algorithms could be utilized. For instance, the customers of a bank can form different groups based on their financial or demographic profiles. It is possible to apply clustering techniques to detect these different groups among the customers so that the bank can choose a different marketing strategy for each group. Besides, genes which have similar functions can be detected by grouping genetic codes of living organisms.

In the literature, there are different approaches dealing with the problem. K-means algorithm and hierarchical clustering are the most well-known examples. All of these approaches in the literature perform clustering based on distance calculations between data points. Hence, the number of elements in the dataset is one of the factors that determine the time complexity of the algorithm and the efficiency of the algorithm declines when huge datasets are clustered.

SUMMARY

Today, various applications have to process vast amounts of data. The proposed algorithm in this invention clusters a dataset without being required to perform any distance calculations among the data points that exist in the data. Therefore, complexity of the proposed algorithm does not depend on the number of points in the dataset. Hence, the efficiency of the proposed algorithm is not affected by the size of the dataset and this in turn enables to cluster huge datasets efficiently.

By means of the method of the present invention, it is possible to perform clustering using CA without any distance calculations. The algorithm of the invention maps the data points with the cells of a CA and then performs clustering via a method inspired by the heat transfer process in nature. Initially, each CA cell that contains a data point is considered a distinct cluster. Then, larger clusters are revealed by making use of the interactions between cells. As mentioned above, the propagation of clusters in CA is obtained by a method inspired from the heat transfer process in nature. The CA cells that have data points are considered as heat sources. The virtual heat transferred by the cells causes the cluster regions that consist of the data points in CA to warm up in the automaton. On the other hand, a second cellular automata rule is utilized simultaneously and this rule combines hot neighborhood cells into the same cluster. In the beginning of the process, each cell having a data point is considered as a distinct cluster. Yet, by using the second rule, the said cells unite and enable the clusters to start spreading in the cellular automata.

BRIEF DESCRIPTION OF THE DRAWINGS

The method developed to fulfill the objects of the present invention is illustrated in the following attached figures.

DETAILED DESCRIPTION OF THE EMBODIMENTS

Figures 1, 2:
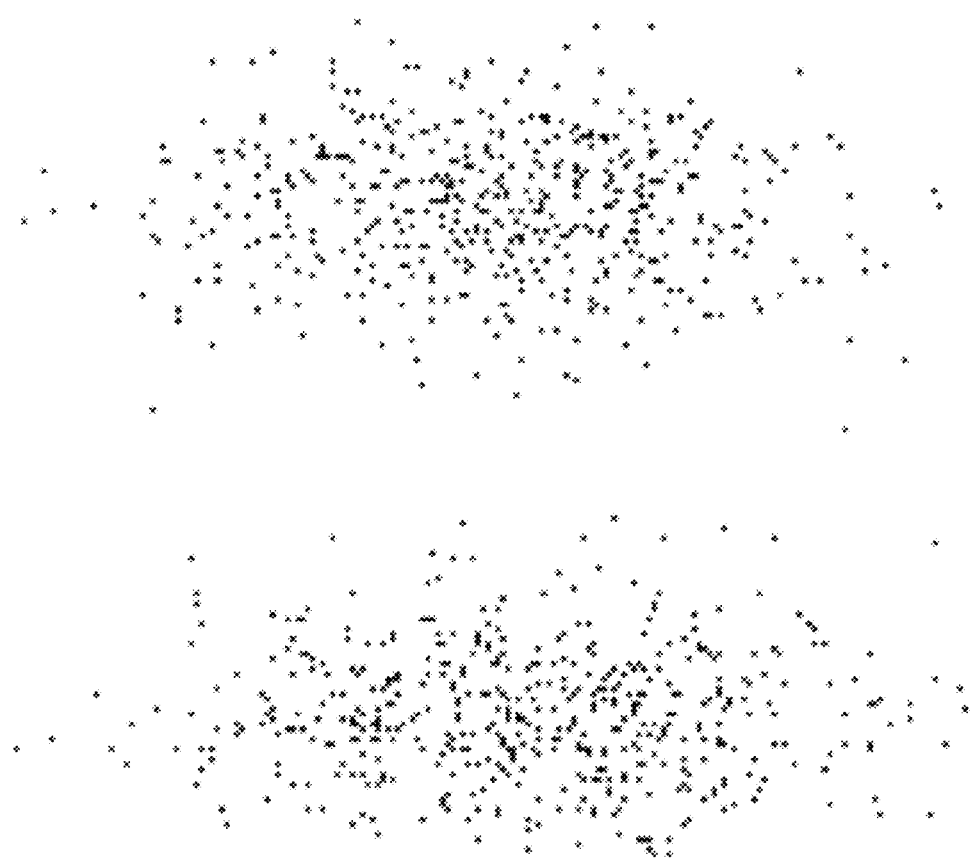
FIG. 1 is a view of the distribution of a dataset on 2 dimensional cellular automata.
FIG. 2 is a view of an example cellular automaton and the initial values of cells.

In the most basic form; the present invention, which enables to cluster huge datasets efficiently without requiring distance calculations, comprises the following steps;

assigning the points of a dataset to the cells of a cellular automaton, assigning each cell, to which a data point is assigned, to a distinct state value and a constant temperature value; and assigning all of the cells, to which a data point is not assigned, to a unique state value different from the state values utilized for cells that contain a data point (for instance state 0) and a temperature value lower than the said constant temperature value, selecting a cell in the cellular automaton randomly, calculating the average temperature value of the selected cell and its neighbor cells, determining if the selected cell and its neighbor cells have an assigned data point or not, setting the temperature of the cells, which do not contain a data point, as the average temperature, not updating the temperature value of the cells containing a data point, determining if the temperature of the neighbor cells is above a predetermined threshold value or not, if a neighbor cell temperature is above the predetermined threshold value, moving this neighbor cell to the state of the selected cell, determining if the total number of distinct states has fallen to the number of clusters which will be used for grouping the dataset as a parameter that would be given to the algorithm as an input through a data entry interface, terminating the process if the number of distinct states has fallen (is equal) to the number of clusters used to group the dataset, otherwise, going back to the step "selecting a cell in the cellular automaton randomly".

The method of the present invention is a computer application that can be executed by an electronic device (e.g. notebook, desktop, tablet computer, etc.). The said electronic device comprises a storage unit (e.g. a hard disk, flash disk, etc.) for storing the data that will be used in the invention, a processing unit (e.g. a microprocessor) for processing the data with rules, a data entry interface (e.g. a mouse, keyboard or a virtual keyboard) for inputting the said rules, dataset and the number of clusters that will be utilized for clustering the dataset and a monitor (e.g. an LCD monitor, touchscreen, etc.) for displaying the results to the user.

The method of the present invention makes it possible to cluster huge datasets efficiently by using cellular automata without requiring any distance calculations. At the beginning of the procedure, the points in the dataset entered to the system by using a data entry interface is mapped to the cells of an n-dimensional cellular automaton. Each point in the dataset is identified with a certain number of attributes. For instance, the age, the monthly income, the amount of bank deposits, etc. form the attributes of a bank customer. Different datasets have different number of attributes. When a dataset is mapped to a cellular automaton, the number of attributes in the dataset determines the number of dimensions in the cellular automaton. For each attribute, the data point that has the smallest value is mapped to the first cell in the corresponding dimension and certainly the data point with the maximum value is mapped to the last cell.

$$i_d = \left\lfloor \frac{x^{(d)} - x^{(d)}_{min}}{\left(x^{(d)}_{max} - x^{(d)}_{min}\right)/m} \right\rfloor + 1$$

The formula used for performing the said mapping is provided in the above equation. The cell index ($i_d$) of any data point in dimension d is calculated by means of the said formula and the said data point is placed into a cell of the cellular automaton. In the above equation, $x^{(d)}$ denotes the value of the corresponding data point in dimension d, $x^{(d)}_{max}$, $x^{(d)}_{min}$ denote the minimum and maximum values in dimension d in the dataset, and finally m denotes the number of cells present in cellular automaton in dimension d. FIG. 1 shows a two dimensional data placed in a cellular automaton.

In a standard CA application, each cell in the automata can be in one of a finite number of states, and during the process of computation, each cell can change its state according to the predetermined rules. Certain updates have been carried out on this standard framework in order to utilize the CA model for the clustering task. The method aims to represent the different clusters in the dataset with different states in the cellular automata. Hence, if a group of CA cells are in the same state, then these cells will be in the same cluster. In the beginning of the process, each CA cell that contains a data point is assigned a distinct state. The cells that do not contain data points are accepted to be in state 0. Hence, if there are n points in the dataset, the cells could be in one of the n+1 different states. If more than one data point is assigned to the same cell, then the total number of distinct states in the CA will decrease.

In the proposed method, the cells will change their state again based on the states of the neighboring cells. With the procedures that will be carried out, it is aimed to gradually decrease the number of different states of the cells and consequently to obtain k+1 distinct states in the CA, where k denotes the number of clusters assumed to be in the dataset. Thus, at the end of the procedure, the cells will be in one of the k number of clusters depending on the state thereof. However, some cells could be still in state 0 after the execution. This is why k+1 states will exist in the CA when the operation terminates.

As stated above, the process of forming clusters in the CA is inspired by the heat transfer process in nature. That is why, a temperature value is also kept for each cell in our model besides the state value. In the present method, the cells change their state based on their neighbor cell temperatures. In the beginning of the procedure, the cells, to which a data point is assigned, are considered to be heat sources. Such cells are determined to have a fixed temperature of 100° and this temperature does not change at all throughout the procedure. Yet, the proposed method is not limited to the said temperature value. A higher or lower temperature value can also be used. A simple rule is used to transfer the heat energy generated by these source cells to other cells in the CA. According to this rule, temperature of a cell is determined as the average temperature of itself and its neighbor cells. Temperature of the cells that do not contain a data point will be 0° at the beginning of the procedure. Again, the method of the invention is not limited to the said temperature value. A higher or lower temperature value can also be used. By means of this rule, first of all the neighbor cells (in other words, top, bottom, right and left neighbor cells) near the heat sources (data points) will start to warm up and this process of warming will spread to different regions of the CA. On the other hand, since the cells, which are heat sources, i.e. have data points, have fixed temperatures, they are not affected by this rule.

Concordant to this warming process, there is a second transfer rule utilized in our CA model for changing the states of the cells. This second rule aims the cells to change their states and form a structure that represents the cluster distribution in the dataset. In the present method, if temperature of the neighbor cell of a selected cell is above 80°, the said neighbor cell and the randomly selected cell fall into the same state. Hence when a certain amount of warming up is achieved in the CA, the number of cells in the same state will start to increase and thus the total number of different states in the CA will decrease. Of course when the total number of states decreases to the number of clusters to be used for grouping the data, the procedure is terminated and the results are displayed on the monitor of the electronic device.

In FIG. 2, the initial configuration of a two dimensional CA is given. As can be seen in the figure, each cell contains two integer values, where the first one denotes the temperature and the second one denotes the initial state of the cell. The cells that are in state 0 are the cells that do not contain a data point and hence they have the temperature 0° as well. Certainly, the cells that have a data point have the temperature 100° and each one is assigned a different state. Note that, six different data points (100°/6, 100°/2, 100°/1, 100°/4, 100°/3 and 100°/5) exist in this example and hence a total of seven different states are utilized in the CA taking into consideration the 0 state as well. On the other side, the final configuration of the CA is presented in FIG. 3. As can be seen in this figure, all of the cells have converged to two distinct states ($5^{th}$ and $6^{th}$ states) in the automaton. That is to say, the automaton has obtained a configuration representing two different clusters. The final temperature values of the cells can also be seen in the figure.

Figures 3, 4:
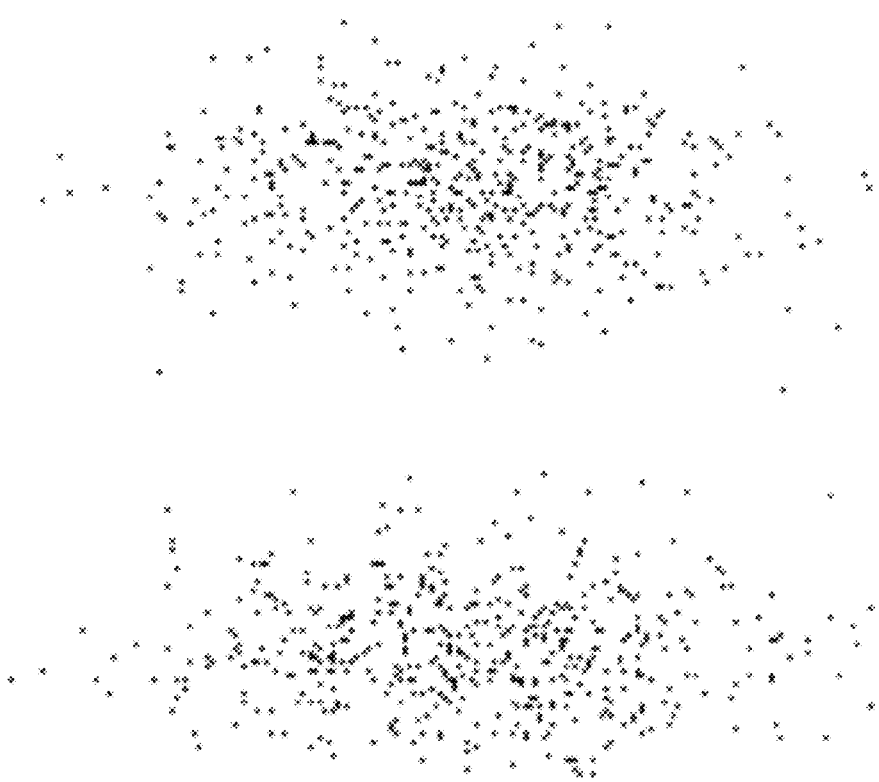
FIG. 3 is a view of the final configuration of the cellular automaton in FIG. 2.
FIG. 4 is a view of the distribution of a dataset in a cellular automaton.
Figure 5:
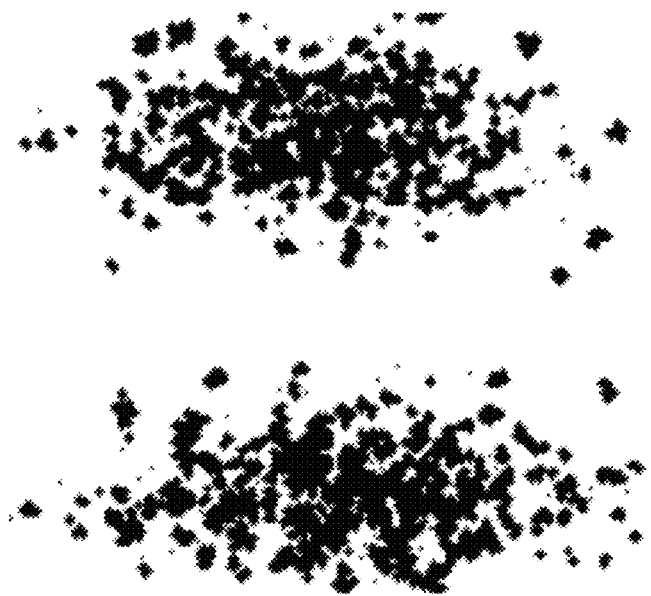
FIG. 5 is a view of the intermediate configuration of the cellular automaton.
Figure 6:
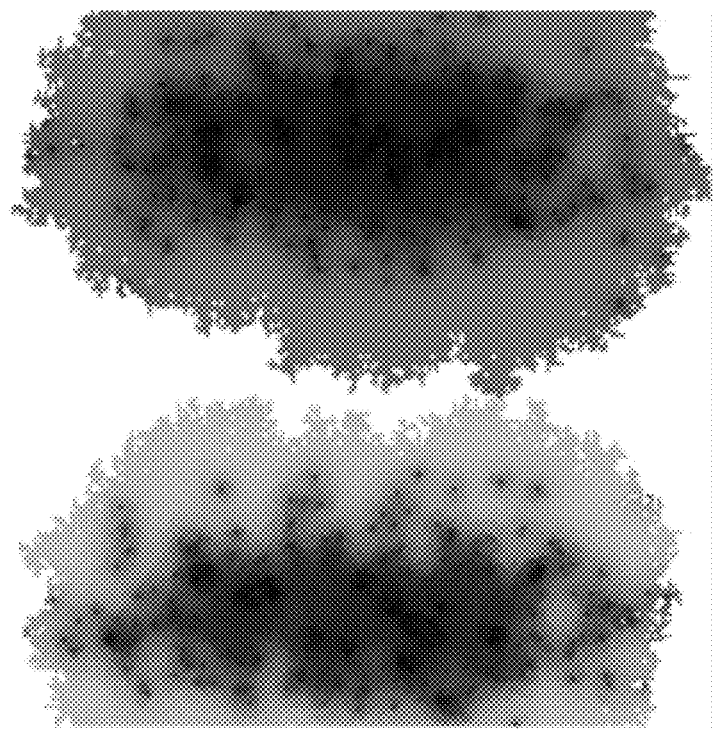
FIG. 6 is a view of the final configuration of the cellular automaton.
Figure 7:
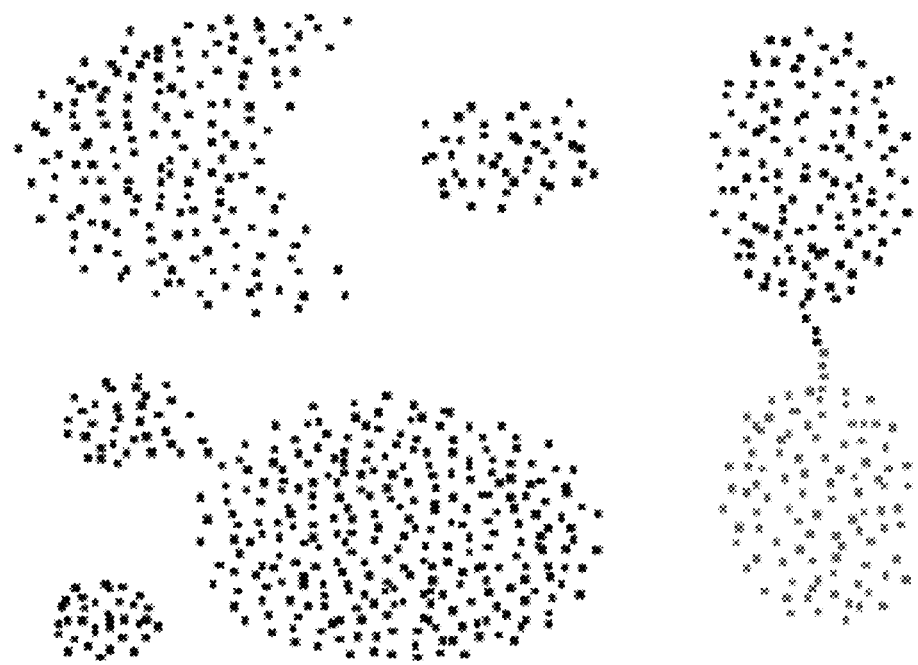
FIG. 7 is a view of the Aggregation dataset.
Figure 8:
FIG. 8 is a view of the Banana dataset.
Figure 9:
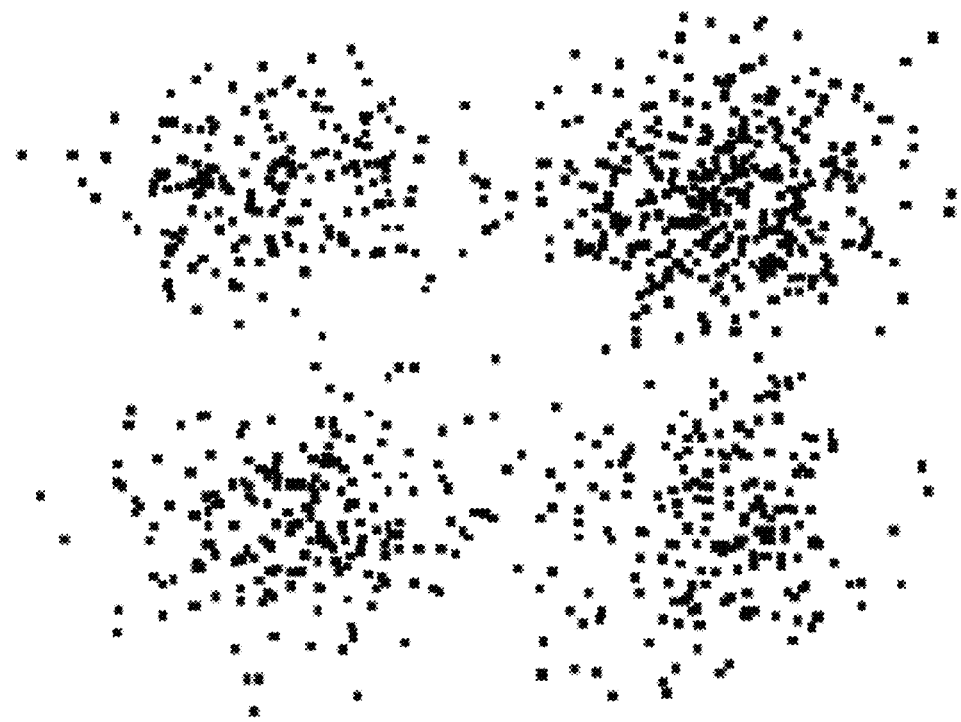
FIG. 9 is a view of the Sizes1 dataset.

In FIG. 4, the same procedure is illustrated on a real dataset this time. The distribution of the dataset in a cellular automaton is given in FIG. 4. In FIG. 5, an intermediate configuration formed before completion of clustering is presented. It can be observed in this figure that the initial clusters represented by the cells having data points have started the process of spreading in the CA. Lastly, FIG. 6 contains the final configuration reached by the CA at the end of the procedure. As can be seen in this figure, the cells of the automaton have converged to two distinct states representing two different clusters. The said state information are denoted by using different colors in the figure (however not shown in the figures). Furthermore, the temperature information is also represented by different color tones, where darker tones represent higher temperature values. As seen in the figure, the temperature has a tendency to increase towards the center of the clusters.

Heat transfer process which has been mentioned above is defined in Algorithm 1.

---
Algorithm 1 Heat Transfer in CA
---
procedure HEAT-TRANSFER(CELL C)
    N←getNeighbour(C)
    AverageTemperature = calculateAverageTemperature(C,N)
    ifempty(C) then
        $C_{temperature}$ = AverageTemperature
    end if
    for each Cell K ∈ Ndo
        ifempty(K) then
            $K_{temperature}$ = AverageTemperature
        end if
    end for
end procedure

---

The defined procedure is applied repeatedly on randomly chosen cells. The randomly chosen cell is denoted as C in the algorithm, whereas N is the set that contains the neighbor cells of cell C. As the first step, the neighbor cells of cell C are determined. Then the average temperature of cell C and its neighbors in N is calculated. This average temperature is set as the temperature of cell C if cell C does not contain any data point (i.e. is temperature is not fixed to 100). The same procedure is performed for all neighbor cells of cell C. This heat transfer rule enables the neighbor cells to share the heat energy that exists in the environment. The rule utilized has the tendency to equalize the temperature in all cells in the long run. However, as it is stated above, temperature of the cells that contain data points do not change, Therefore these cells constantly provide heat energy to the system. Hence, such cells increase the temperatures of the nearby cells. When this procedure is applied repeatedly on randomly chosen cells, it is possible to enable the regions that have more data points inside to get warmer compared to other regions in the CA.

As mentioned before, a second transfer rule is utilized in the system for changing the states of the cells. Note that, each state in the automaton represents a different cluster. This second rule is presented in Algorithm 2.

---
Algorithm 2 State Transfer in CA
---
procedure STATE-TRANSFER(CELL C)
    if$C_{temperature}$>thresholdthen
        N←getNeighbour(C)
        for each Cell K∈Ndo
            if$K_{temperature}$>thresholdthen
                $K_{state} = C_{state}$
                STATE-TRANSFER(K)
            end if
        end for
    end if
end procedure

---

The second rule is also repeatedly executed in parallel to the first rule on randomly chosen cells. When the cells warm up sufficiently enough, they start changing their states based on this second rule. Initially, each cell containing a data point is in a unique state and all other cells are in state 0. As seen in the algorithm, the neighbors of the randomly selected cell C are determined as the first step. If the temperature of a neighbor cell exceeds 80°, which is determined as the threshold value, then the said neighbor cell is moved to the state of the cell C. Additionally, the same algorithm is recursively called on the neighbor cell too. Hence, when sufficient warming is achieved in a certain region, the system enables to spread the cluster corresponding to the said region in the CA very quickly.

Figure 10:
FIG. 10 is a view of the Chainlink dataset.
Figure 11:
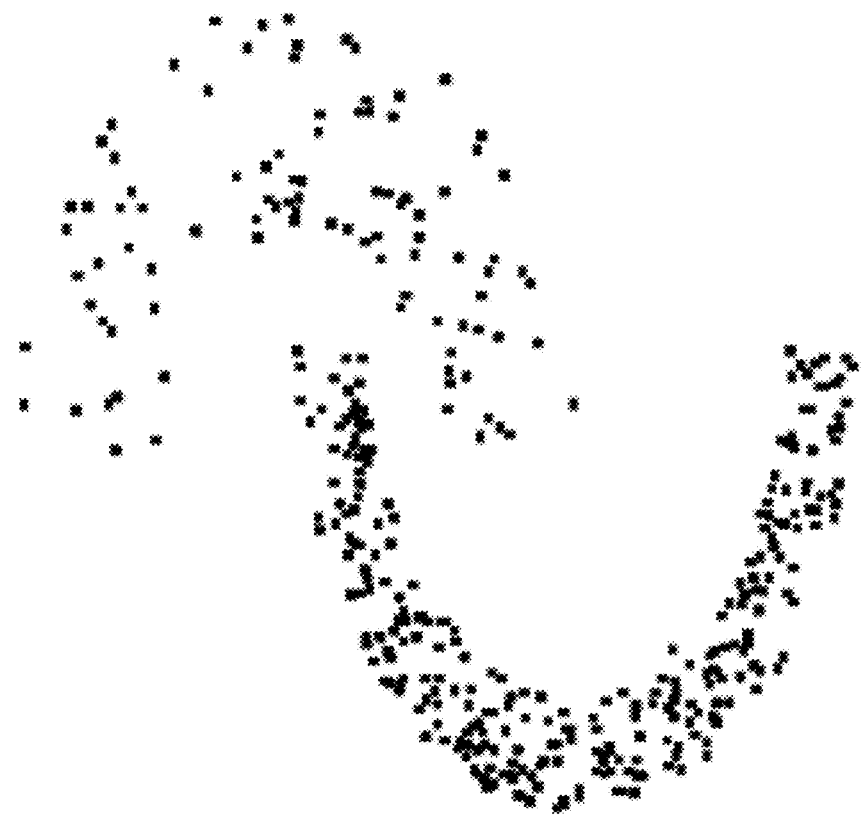
FIG. 11 is a view of the Jain dataset.
Figure 12:
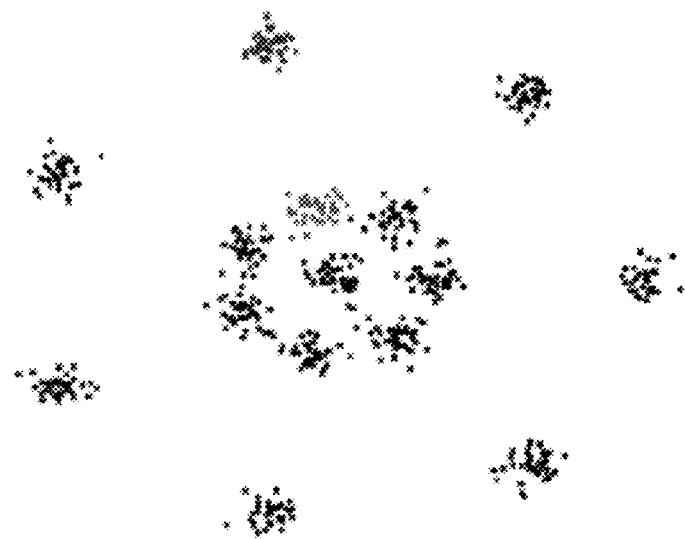
FIG. 12 is a view of R15 dataset.

In order to determine success rate of the system, experiments are conducted on datasets, which are frequently used in literature, are comprised of different number of clusters and have different cluster forms. Furthermore, a software tool that can generate datasets with different number of data points in different dimensions is also utilized throughout the experiments. The method is tested on these different datasets and the results are compared with K-means algorithm. The datasets which are frequently used in literature to determine the performance of clustering approaches are presented in FIGS. 7-12. "Chainlink" dataset given in FIG. 10 is 3-dimensional whereas the others are 2-dimensional.

In the Table 1, the method of the invention is compared with k-means in terms of performance and efficiency. In the table, success rate of both algorithms are presented on the example datasets in FIGS. 7-12 and on some generated datasets. The naming convention Xd-Yc is utilized for the generated datasets, where X denotes the number of dimensions of the data and Y denotes the number of clusters in the dataset. In the table, the results on column "the method of the invention" are obtained with cellular automata. Success rate is defined as the percentage of correctly clustered data points. The results that are presented are the average of 20 different runs.

TABLE 1

Comparison of the method of the present invention
and K-means in terms of performance and efficiency.

| | | K-Means | | The method of the invention | |
|---|---|---|---|---|---|
| Dataset | Number of Data Points | Success Rate (%) | Runtime (sec) | Success Rate (%) | Runtime (sec) |
| Aggregation | 788 | 78.15 | 0.02 | 99.68 | 5.16 |
| Banana | 4811 | 81.51 | 0.05 | 100.0 | 2.66 |
| Jain | 373 | 88.20 | 0.01 | 95.72 | 12.57 |
| R15 | 600 | 80.85 | 0.01 | 99.32 | 1.49 |
| Sizes1 | 1000 | 98.20 | 0.02 | 98.02 | 6.13 |
| Chainlink | 1000 | 64.27 | 0.02 | 99.83 | 0.75 |
| 3d-2c | 70930 | 99.99 | 0.58 | 99.99 | 1.62 |
| 3d-4c | 144824 | 80.69 | 3.38 | 97.39 | 1.37 |
| 3d-6c | 247087 | 73.59 | 10.58 | 94.53 | 2.82 |
| 3d-8c | 405419 | 72.83 | 25.17 | 68.16 | 5.44 |
| 4d-2c | 117565 | 100.0 | 1.04 | 100.0 | 1.26 |
| 4d-4c | 137973 | 82.89 | 4.35 | 70.26 | 2.47 |
| 4d-6c | 178736 | 72.75 | 9.08 | 93.30 | 1.55 |
| 5d-2c | 111541 | 100.0 | 1.08 | 100.0 | 3.10 |
| 5d-4c | 168799 | 70.46 | 9.69 | 99.93 | 2.37 |
| 5d-6c | 162358 | 71.76 | 17.49 | 77.46 | 1.53 |
| 6d-2c | 58140 | 100.0 | 0.57 | 92.97 | 1.49 |
| 6d-4c | 98116 | 75.58 | 5.40 | 91.12 | 0.58 |

K-means algorithm has a remarkable disadvantage. The algorithm requires hyper-spherical clusters in the dataset for a successful clustering. Success rate of k-means declines when datasets do not contain hyper-spherical clusters. For instance, the success rate of K-means goes down to the lowest level (64%) for the "Chainlink" dataset presented in FIG. 10. Besides, on "Banana" (81%) dataset which does not have hyper-spherical clusters and on "Aggregation" (%78) dataset where some clusters are very close to each other, K-means exposes a low success rate compared to the other datasets. However, the success rate of cellular automata based clustering does not depend on the topology of the clusters. It can be seen in the table that the cellular automata cluster all of these different datasets with a high success rate. On the datasets generated automatically by the software tool, particularly when number of clusters increases, it has been observed that success rate of cellular automata may decrease (%68 for 3d-8c dataset, %70 for 4d-4c dataset). However, these datasets are not examples where K-means has achieved very high success rates (72% for 3d-8c dataset, 82% for 4d-4c dataset). In Table 1, two methods are also compared in terms of runtime performance. On smaller datasets, K-means algorithm completes clustering in a shorter period of time. However, the advantage of CA based clustering becomes clear as the datasets get larger. For example it is possible to observe this advantage in the large datasets like 3d-8c or 5d-6c. In order to observe the said advantage of cellular automata more clearly, the effect of increase in the number of data points of the 3-dimensional datasets on the two algorithms is illustrated in FIG. 13.

Figure 13:
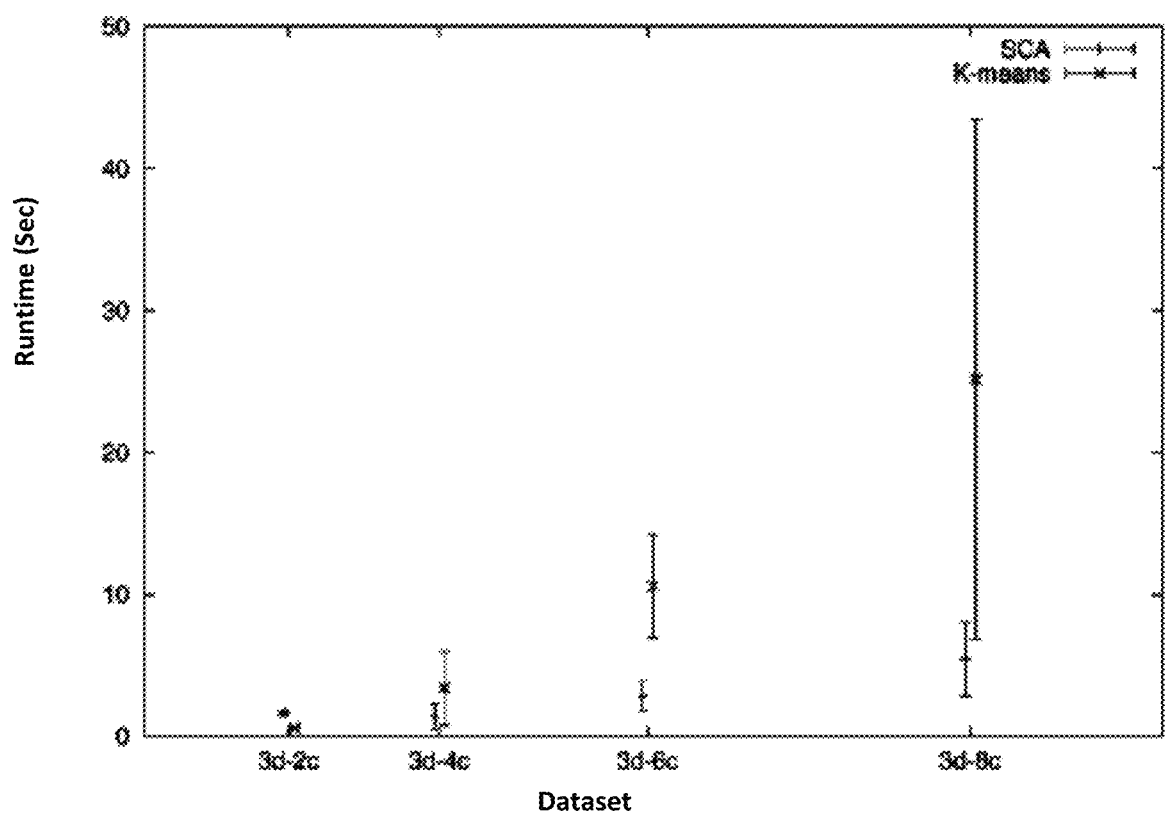
FIG. 13 is a view of Runtime comparison of the algorithms

As seen in FIG. 13, when the number of points of the dataset increases, the runtime required by K-means algorithm rapidly increases. However this is not the case for cellular automata.

What is claimed is:

1. A computer-implemented method which enables to cluster data using an electronic device, wherein, the electronic device comprises a data entry interface to enter rules, data, and number of clusters to be used for clustering the data; a storage unit to store the rules; a processing unit to process the data according to the rules and a monitor to display results to the user; the method comprising:
    assigning points of a dataset input via the data entry interface to a first plurality of cells of a cellular automaton;
    assigning each cell from the first plurality of cells a distinct state value and a constant temperature value; and assigning each cell from a second plurality of cells a unique state value different from the distinct state values assigned to the first plurality of cells and a temperature value lower than the constant temperature value, wherein to the second plurality of cells no data point value is assigned;
    selecting a first cell in the cellular automaton randomly;
    calculating an average temperature value of the first cell and neighbor cells of the first cell;
    determining if the first cell and the neighbor cells of the first cell have an assigned data point or not;
        setting a temperature value of the cells from the first cell and the neighbor cells not having the assigned data point as the average temperature;
        not updating the temperature value of the cells from the first cell and the neighbor cells having the assigned data point;
    determining if the temperature of the neighbor cells is above a predetermined threshold value or not;
        if a neighbor cell temperature is above the predetermined threshold value, moving the neighbor cell to a state of the first cell;
    determining if a total number of the distinct states has fallen to the number of clusters to be used for clustering the data as a parameter to be given to an algorithm as an input through the data entry interface;
        if the number of distinct states has fallen to a number equal to the number of clusters to be used for clustering the data, generating a clustering result by grouping cells having a same temperature state and without distance calculations among cells of the cellular automaton or among data instances, displaying the clustering result to the user by the monitor, and terminating the method;
    otherwise, going back to the step of the selecting the first cell in the cellular automaton randomly.

2. The method according to claim 1, further comprising calculating an index value ($i_d$) of any data point in dimension d according to the following formula $$i_d = \left\lfloor \frac{x^{(d)} - x^{(d)}_{min}}{\left(x^{(d)}_{max} - x^{(d)}_{min}\right)/m} \right\rfloor + 1$$

and arranging the data point in a cell of the cellular automaton according to the calculated index value by using the value ($x^{(d)}$) of the data point in dimension d, a maximum value $x^{(d)}_{max}$ and a minimum value $x^{(d)}_{min}$ in the dataset for dimension d, and a number of cells (m) in the cellular automaton in dimension d in the step of the assigning the points of the dataset to the cells of the cellular automaton.

* * * * *